United States Patent
Matsuda (10) Patent No.: US 7,266,240 B2
(45) Date of Patent: Sep. 4, 2007

(54) IMAGE PROCESSING SYSTEM, PROJECTOR, COMPUTER-READABLE MEDIUM, AND IMAGE PROCESSING METHOD

(75) Inventor: Hideki Matsuda, Fujimi-machi (JP)

(73) Assignee: Seiko Epson Corporation, Tokyo (JP)

(*) Notice: Subject to any disclaimer, the term of this patent is extended or adjusted under 35 U.S.C. 154(b) by 623 days.

(21) Appl. No.: 10/806,207

(22) Filed: Mar. 23, 2004

(65) Prior Publication Data

US 2004/0240748 A1 Dec. 2, 2004

(30) Foreign Application Priority Data

Mar. 28, 2003 (JP) .............................. 2003-091720

(51) Int. Cl.
G06K 9/00 (2006.01)
(52) U.S. Cl. ........................................ 382/167; 353/69
(58) Field of Classification Search ................ 382/164, 382/167, 274; 358/518, 520; 345/83, 88, 345/590, 591, 690; 348/222.1, 177, 180, 348/189, 191, 658, 806, 744, 745–747; 353/69, 353/121, 122
See application file for complete search history.

(56) References Cited

U.S. PATENT DOCUMENTS

| | | | | |
|---|---|---|---|---|
| 5,313,291 A | * | 5/1994 | Appel et al. ................. | 358/501 |
| 5,870,069 A | | 2/1999 | Choh et al. | |
| 6,078,309 A | * | 6/2000 | Chen et al. .................. | 345/589 |
| 6,219,011 B1 | * | 4/2001 | Aloni et al. .................. | 345/1.3 |
| 6,483,537 B1 | * | 11/2002 | Mayer et al. ................ | 348/180 |
| 6,558,006 B2 | * | 5/2003 | Ioka ............................ | 353/94 |
| 6,677,988 B2 | * | 1/2004 | Usami ......................... | 348/179 |
| 6,753,907 B1 | * | 6/2004 | Sukthankar et al. ...... | 348/222.1 |
| 6,771,307 B2 | * | 8/2004 | Waki et al. .................. | 348/189 |
| 6,940,531 B2 | * | 9/2005 | Wada .......................... | 345/690 |
| 7,038,727 B2 | * | 5/2006 | Majumder et al. .......... | 348/383 |
| 2002/0041364 A1 | | 4/2002 | Ioka | |
| 2002/0070944 A1 | | 6/2002 | Deering | |

FOREIGN PATENT DOCUMENTS

| | | |
|---|---|---|
| JP | A 08-190633 | 7/1996 |
| JP | A 2000-284363 | 10/2000 |
| JP | A 2001-296026 | 10/2001 |
| JP | A 2002-072359 | 3/2002 |
| JP | A 2002-140060 | 5/2002 |
| JP | A 2002-144670 | 5/2002 |
| JP | A 2002-144671 | 5/2002 |
| JP | A 2003-014666 | 1/2003 |
| JP | A 2004-030430 | 1/2004 |

* cited by examiner

*Primary Examiner*—Samir Ahmed
(74) *Attorney, Agent, or Firm*—Oliff & Berridge, PLC (57) ABSTRACT

To provide an image processing system enabling association of the coordinates of a sensed projected image in a sensing area with the coordinates of the spatial light modulator, a projector is formed of: an image projecting section which projects calibration images; a ratio information generating section which computes a ratio of image signal values or luminance values for each pixel in the sensing area obtained by sensing the calibration images, based on sensed information from a sensor which senses the calibration images, to generate ratio information; an edge point detecting section which searches the ratio information to detect corner points of a sensed projected image for each pixel having a ratio equal to or larger than a predetermined value; a pixel block image information generating section which converts sensed information of an area defined by the detected corner points into pixel block image information representing a ratio of image signal values or luminance values for each pixel block including one or more pixels.

8 Claims, 7 Drawing Sheets

IMAGE PROCESSING SYSTEM, PROJECTOR, COMPUTER-READABLE MEDIUM, AND IMAGE PROCESSING METHOD

Japanese Patent Application No. 2003-91720, filed on Mar. 28, 2003 is hereby incorporated by reference in its entirety.

BACKGROUD OF THE INVENTION

The present invention relates to an image processing system, projector, program, information storage medium and image processing method which can detect a sensed projected image based on sensed information.

If an image is displayed in an image display device such as a projector for a long term, the image will gradually deteriorate due to color non-uniformity occurred therein (including color non-uniformity from luminance non-uniformity).

For example, in a store or exhibition ground, an image may continuously be displayed on a screen through a projector for a long term. In such a case, an original display effect may be lost by color non-uniformity occurred in the image due to deterioration of a liquid crystal panel or polarizing plate from the long-term projection of the image.

In view of such a problem, for example, Japanese Patent Laid-Open No. 2002-140060 has proposed an image processing system which can more adequately correct color non-uniformity due to deterioration with time by detecting a sensed projected image based on sensed information and using the luminance value within the sensed projected image included in the sensed information.

However, Japanese Patent Laid-Open No. 2002-140060 does not particularly describe a technique for causing the coordinates of the sensed projected image in the sensing area to be precisely associated with the coordinates of the spatial light modulator.

In particular, if there is a distortion in the image, it is important that the coordinates of the sensed projected image in the sensing area is precisely associated with the coordinates of the spatial light modulator.

BRIEF SUHMARY OF THE INVENTION

The present invention is made in view of the above-mentioned problem and its object is to provide an image processing system, projector, program, information storage medium and image processing method which can cause the coordinates of the sensed projected image in the sensing area to be precisely associated with the coordinates of the spatial light modulator.

To solve the above problem, according to a first aspect of the present invention, there is provided an image processing system comprising:

image projection means for projecting at least two different colored calibration images at different points of time;

sensing means for sensing each of the projected calibration images to output sensed information;

ratio information generating means for computing a ratio of image signal values or luminance values for each pixel in a sensing area obtained by sensing the calibration images, based on the sensed information to generate ratio information;

edge point detecting means for searching the ratio information to find a first value which represents a ratio of image signal values or luminance values among pixel regions each having a predetermined number of pixels in the sensing area, and for detecting edge points of a sensed projected image, based on part of the pixel regions each having the first value equal to or larger than a first predetermined value;

pixel block image information generating means for converting sensed information of an area defined by the detected edge points into pixel block image information representing a ratio of image signal values or luminance values for each pixel block including one or more pixels, based on the sensed information and the detected edge points; and correction means for correcting an image signal based on the pixel block image information, wherein the image projection means projects an image based on the corrected image signal.

According to a second aspect of the present invention, there is provided an image processing system comprising:

image projection section which projects at least two different colored calibration images at different points of time;

sensing section which senses each of the projected calibration images to output sensed information;

ratio information generating section which computes a ratio of image signal values or luminance values for each pixel in a sensing area obtained by sensing the calibration images, based on the sensed information to generate ratio information;

edge point detecting section which searches the ratio information to find a first value which represents a ratio of image signal values or luminance values among pixel regions each having a predetermined number of pixels in the sensing area, and detects edge points of a sensed projected image, based on part of the pixel regions each having the first value equal to or larger than a first predetermined value;

pixel block image information generating section which converts sensed information of an area defined by the detected edge points into pixel block image information representing a ratio of image signal values or luminance values for each pixel block including one or more pixels, based on the sensed information and the detected edge points; and correction section which corrects an image signal based on the pixel block image information, wherein the image projection section projects an image based on the corrected image signal.

According to a third aspect of the present invention, there is provided a projector comprising:

image projection means for projecting at least two different colored calibration images at different points of time;

sensing means for sensing each of the projected calibration images to output sensed information;

ratio information generating means for computing a ratio of image signal values or luminance values for each pixel in a sensing area obtained by sensing the calibration images, based on the sensed information to generate ratio information;

edge point detecting means for searching the ratio information to find a first value which represents a ratio of image signal values or luminance values among pixel regions each having a predetermined number of pixels in the sensing area, and for detecting edge points of a sensed projected image, based on part of the pixel regions each having the first value equal to or larger than a first predetermined value;

pixel block image information generating means for converting sensed information of an area defined by the detected edge points into pixel block image information representing a ratio of image signal values or luminance values for each pixel block including one or more pixels, based on the sensed information and the detected edge points; and correction means for correcting an image signal based on the pixel block image information, wherein the image projection means projects an image based on the corrected image signal.

According to a fourth aspect of the present invention, there is provided a projector comprising:

image projection section which projects at least two different colored calibration images at different points of time;

sensing section which senses each of the projected calibration images to output sensed information;

ratio information generating section which computes a ratio of image signal values or luminance values for each pixel in a sensing area obtained by sensing the calibration images, based on the sensed information to generate ratio information;

edge point detecting section which searches the ratio information to find a first value which represents a ratio of image signal values or luminance values among pixel regions each having a predetermined number of pixels in the sensing area, and detects edge points of a sensed projected image, based on part of the pixel regions each having the first value equal to or larger than a first predetermined value;

pixel block image information generating section which converts sensed information of an area defined by the detected edge points into pixel block image information representing a ratio of image signal values or luminance values for each pixel block including one or more pixels, based on the sensed information and the detected edge points; and correction section which corrects an image signal based on the pixel block image information, wherein the image projection section projects an image based on the corrected image signal.

According to a fifth aspect of the present invention, there is provided a computer-readable program causing a computer to function as:

image projection means for projecting at least two different colored calibration images at different points of time;

sensing means for sensing each of the projected calibration images to output sensed information;

ratio information generating means for computing a ratio of image signal values or luminance values for each pixel in a sensing area obtained by sensing the calibration images, based on the sensed information to generate ratio information;

edge point detecting means for searching the ratio information to find a first value which represents a ratio of image signal values or luminance values among pixel regions each having a predetermined number of pixels in the sensing area, and for detecting edge points of a sensed projected image, based on part of the pixel regions each having the first value equal to or larger than a first predetermined value;

pixel block image information generating means for converting sensed information of an area defined by the detected edge points into pixel block image information representing a ratio of image signal values or luminance values for each pixel block including one or more pixels, based on the sensed information and the detected edge points; and correction means for correcting an image signal based on the pixel block image information, wherein the image projection means projects an image based on the corrected image signal.

According to a sixth aspect of the present invention, there is provided an information storage medium storing a computer-readable program which causes a computer to function as:

image projection means for projecting at least two different colored calibration images at different points of time;

sensing means for sensing each of the projected calibration images to output sensed information;

ratio information generating means for computing a ratio of image signal values or luminance values for each pixel in a sensing area obtained by sensing the calibration images, based on the sensed information to generate ratio information;

edge point detecting means for searching the ratio information to find a first value which represents a ratio of image signal values or luminance values among pixel regions each having a predetermined number of pixels in the sensing area, and for detecting edge points of a sensed projected image, based on part of the pixel regions each having the first value equal to or larger than a first predetermined value;

pixel block image information generating means for converting sensed information of an area defined by the detected edge points into pixel block image information representing a ratio of image signal values or luminance values for each pixel block including one or more pixels, based on the sensed information and the detected edge points; and correction means for correcting an image signal based on the pixel block image information, wherein the image projection means projects an image based on the corrected image signal.

According to a seventh aspect of the present invention, there is provided an image processing method comprising:

sequentially projecting a plurality of monochromatic calibration images of different colors;

sensing the projected calibration images and outputting sensed information;

computing a ratio of image signal values or luminance values for each pixel in a sensing area obtained by sensing the calibration images, based on the sensed information;

generating ratio information for the sensing area;

searching the ratio information to find a first value which represents a ratio of image signal values or luminance values among pixel regions each having a predetermined number of pixels in the sensing area, and detecting edge points of a sensed projected image, based on part of the pixel regions having the first value equal to or larger than a first predetermined value;

converting sensed information of an area defined by the detected edge points into pixel block image information representing a ratio of image signal values or luminance values for each pixel block including one or more pixels, based on the sensed information and the detected edge points;

correcting an image signal to correct at least one of distortion, color and brightness in the image, based on the pixel block image information; and projecting an image based on the corrected image signal.

The image processing system and others of the present invention can more precisely and effectively detect edge points in a sensed projected image than the conventional technique of detecting edge points through filtering, by using ratio information provided when the ratio of image signal values or luminance values of the associated pixels in the sensing area is computed. Thus, the image processing system and others can cause the coordinates of the sensed projected image in the sensing area to be precisely associated with the coordinates of the spatial light modulator.

The image processing system and others can more effectively perform the image processing because they use the ratio rather than the differential value and do not require any change of the first predetermined value which is a determination criterion for edge points in the sensed projected image.

Moreover, an accurate correction can be made for each pixel block even if the sensed projected image is divided into pixel blocks for correcting image signals, since the sensed projected image in the sensing area can be accurately detected. Thus, a correct image can be displayed.

The number of pixel blocks in the pixel block image information may be the number of pixel blocks according to the processing of the correction means. Furthermore, the pixel area or pixel block may correspond, for example, to one pixel, a plurality of pixels, one pixel line, a plurality of pixel lines, a rectangular area configured by a plurality of pixels or the like. It is not necessary that the pixel area and pixel block have the same unit. For example, a pixel area may includes one pixel and a pixel block may be a rectangular area including a plurality of pixels.

In the image processing system, projector, program, and information storage medium, the ratio information generating means may include means for detecting a rectangular region defined by the pixel regions each having the first value equal to or larger than the first predetermined value as a temporary sensed projected image by searching the ratio information for the first value in vertical and horizontal directions from corner points of an area corresponding to the sensing area represented by the ratio information; an image projected by the image projection means may be a quadrangle; and the edge point detecting means may detect corner points at four corners of the sensed projected image as the edge points of the sensed projected image, based on the temporary sensed projected image.

The image processing method may further comprise:

detecting a rectangular region defined by the pixel regions each having the first value equal to or larger than the first predetermined value as a temporary sensed projected image by searching the ratio information for the first value in vertical and horizontal directions from corner points of an area corresponding to the sensing area represented by the ratio information; and detecting corner points at four corners of the sensed projected image as the edge points of the sensed projected image, based on the temporary sensed projected image.

Thus, when an ordinary rectangular image is projected, the image processing system and others can precisely and effectively detect the four corner points in the sensed projected image by simply detecting a temporary sensed projected image and then detecting an actual sensed projected image based on the temporary sensed projected image.

In the image processing system, projector, program and information storage medium, when the number of detected corner points is three or less in detecting corner points at four corners of the sensed projected image, the edge point detecting means may detect other corner points by using a predetermined method; and the predetermined method may include:

counting the numbers of pixels from an edge pixel to a pixel having the ratio represented by the ratio information equal to or larger than a second predetermined value in each pixel line of the temporary sensed projected image;

computing a changing rate of a ratio of the number of pixels in every two adjacent pixel lines of the temporary sensed projected image; and detecting pixels having the ratio represented by the ratio information equal to or larger than the second predetermined value as the other corner points in a pixel line having the changing rate equal to or larger than a third predetermined value.

In the image processing method, when the number of detected corner points is three or less in detecting corner points at four corners of the sensed projected image, other corner points may be detected by a predetermined method; and the predetermined method may include:

counting the numbers of pixels from an edge pixel to a pixel having the ratio represented by the ratio information equal to or larger than a second predetermined value in each pixel line of the temporary sensed projected image;

computing a changing rate of a ratio of the number of pixels in every two adjacent pixel lines of the temporary sensed projected image; and detecting pixels having the ratio represented by the ratio information equal to or larger than the second predetermined value as the other corner points in a pixel line having the changing rate equal to or larger than a third predetermined value.

Thus, the image processing system and others can detects correct corner points through different searching methods even if only three or less corner points are detected in detecting four corner points in the sensed projected image. Thus, even if the image is distorted into various different shapes, the image processing system and others can precisely and effectively detect the four corner points in the sensed projected image. Therefore, the coordinates of the sensed projected image in the sensing area can precisely be associated with the coordinates of the spatial light modulator.

In connection with this, the first and second predetermined values may be identical with or different from each other.

In the image processing system, projector, program and information storage medium, the correction means may include: distortion correction means for correcting an image signal to correct a distortion in an image based on the pixel block image information when a predetermined calibration image is projected; and color non-uniformity correction means for correcting an image signal to correct color non-uniformity based on the pixel block image information when a predetermined calibration image is projected; and the image projection means may project an image based on the corrected image signal.

Since the image processing system and others can precisely detect the sensed projected image in the sensing area, they can precisely correct the distortion and color non-uniformity in the image for each pixel block even if the sensed projected image is divided into pixel blocks for correcting image signals. In such a manner, a correct image can be displayed.

DETAILED DESCRIPTION OF THE EMBODIMENT

The present invention will now be described in connection with a projector having an image processing system with reference to the drawing. It is to be understood that an embodiment shown in the following is not intended to limit the subject matter of the invention as described in the accompanying claims and that all the components shown in such an embodiment is not necessarily essential for practicing the invention defined by the accompanying claims.

The Whole System

Figure 1:
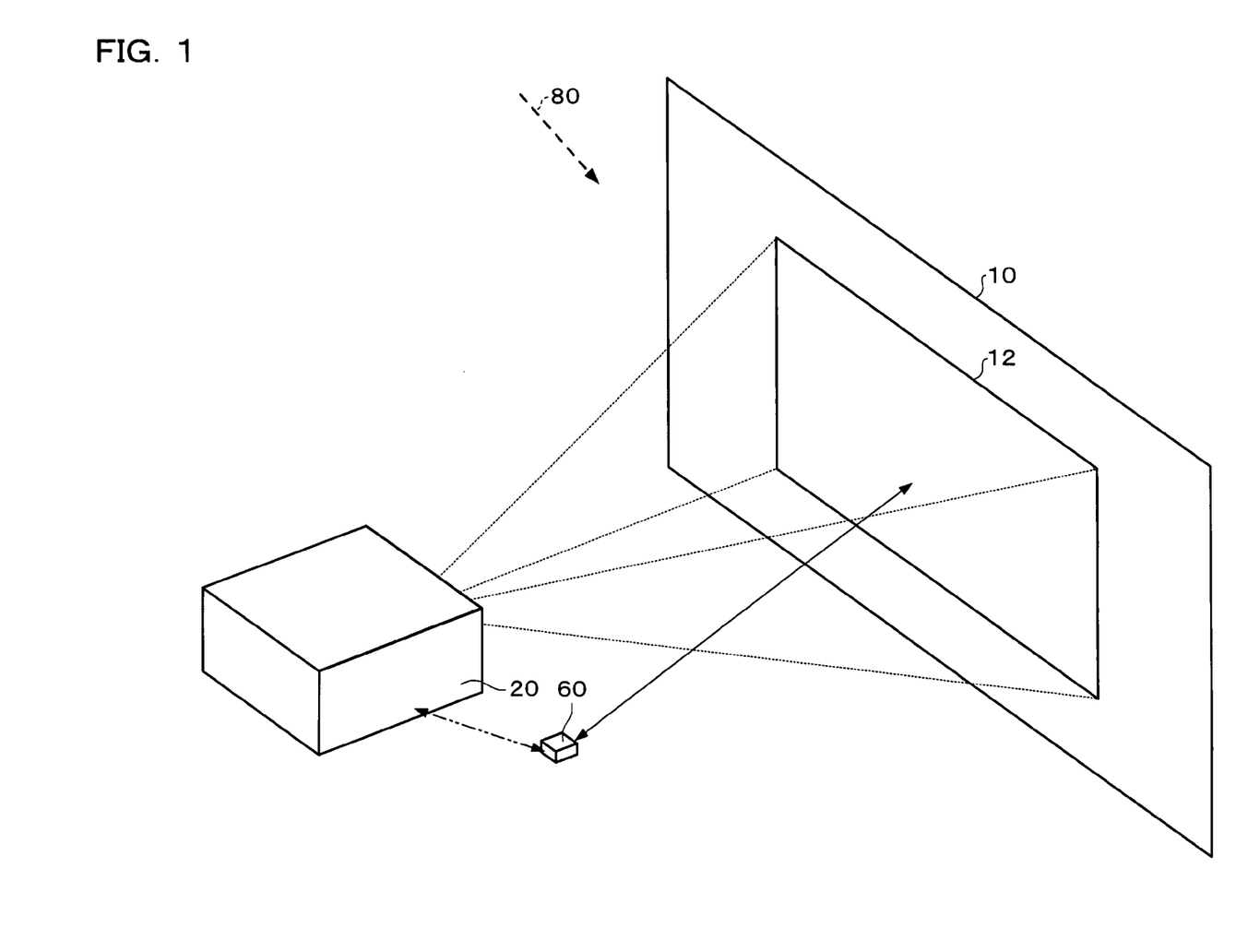
FIG. 1 is a diagram schematically showing an image projected according to one embodiment of the present invention.

FIG. 1 is a diagram schematically showing an image projected according to one embodiment of the present invention.

A projector 20 projects an image onto a screen 10. Thus, a projected image 12 is formed on the screen 10.

When an image is continuously displayed through a projection type image display device such as the projector 20 for a long term, color non-uniformity (including color non-uniformity due to luminance non-uniformity) will gradually occur in the projected image 12 due time degradation as in its optical system or the like.

In addition, the image appearance in the projected image 12 will vary due to an ambient light 80 such as sunlight and illuminating light.

Furthermore, the projected image 12 may be distorted depending on an angle included between the screen 10 and the optical axis of the projected light from the projector 20.

To correct such color non-uniformity and distortion in the projected image 12, the projector 20 according to this embodiment has a sensor 60 which functions as sensing means. The sensor 60 picks up a screen region including the projected image 12.

It is assumed in this embodiment that the sensor 60 is mounted in a so-called remote controller and configured as a component separate from the projector 20. As a user activates a sensing button on the remote controller, the projected image 12 on the screen 10 is sensed through the sensor 60. The projector 20 receives, from the sensor 60, sensed information which represents an image signal value for each pixel in the sensing area or a luminance value transformed from the image signal value.

Figure 2:
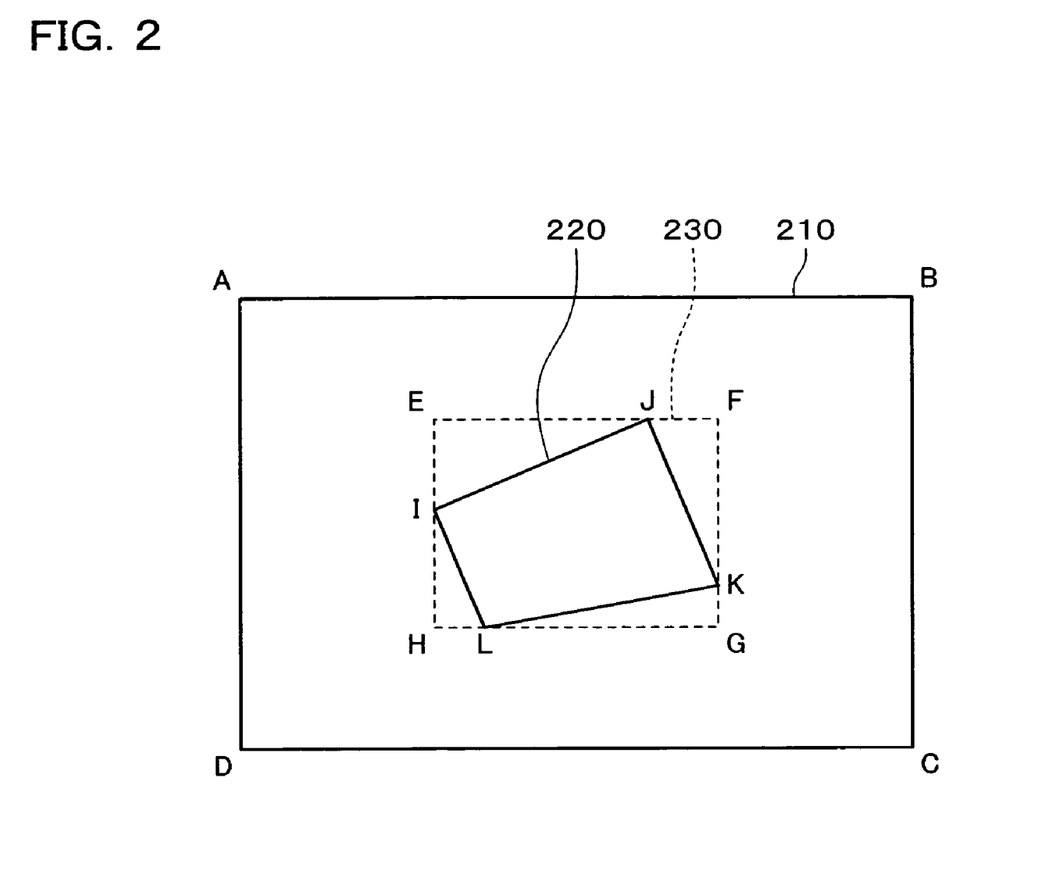
FIG. 2 is a diagram showing a sensing area according to one embodiment of the present invention.

FIG. 2 is a diagram showing a sensing area 210 according to one embodiment of the present invention.

Referring to FIG. 2, the sensing area 210 is shown to be a rectangular region ABCD including a predetermined number of pixels. A sensed projected image 220 representing the actual shape of a projected image is shown to be a region surrounded by four points I, J, K and L. A rectangular region EFGH adjoining to the region IJKL forms a temporary sensed projected image 230.

In this embodiment, the projector 20 computes and stores a ratio for each pixel between an image signal value or luminance value in the sensing area 210 when a white-colored monochromatic image is projected and an image signal value or luminance value in the sensing area 210 when a black-colored monochromatic image is projected or not projected.

The projector 20 compares the sum of these ratios with a first predetermined value for each of predetermined pixel regions (each including one pixel, one line, a rectangular region configured by a plurality of pixels or the like) which are taken in the inward direction from each corner point in the sensing area 210.

The projector 20 then detects, as the temporary sensed projected image 230, a rectangular region surrounded by pixel regions in which the sum of ratios is judged to be equal to or larger than the first predetermined value when the search is performed in four vertical and horizontal directions.

Furthermore, the projector 20 compares the ratio for each of the pixels disposed on the respective sides of the temporary sensed projected image 230 extending from the four corners thereof (as the case may be, within the interior of the temporary sensed projected image 230) with a second predetermined value. The projector 20 then detects the sensed projected image 220 which includes corner points consisting of pixels each of which has its ratio equal to or larger than the second predetermined value.

In such a manner, the projector 20 according to this embodiment can more effectively detect the sensed projected image 220 by detecting it after the temporary sensed projected image 230 has been detected simply since it is unnecessary that the sensed projected image 220 is detected through the filtering as in the prior art.

In this embodiment, furthermore, the projector 20 causes the projected image 12 to be associated with the display device thereof by generating a predetermined pixel block image based on the sensed projected image 220 thus detected.

Thus, the projector 20 can more precisely correct the distortion or color in the projected image.

The functional blocks of the projector 20 for implementing such a feature will be described blow.

Figure 3:
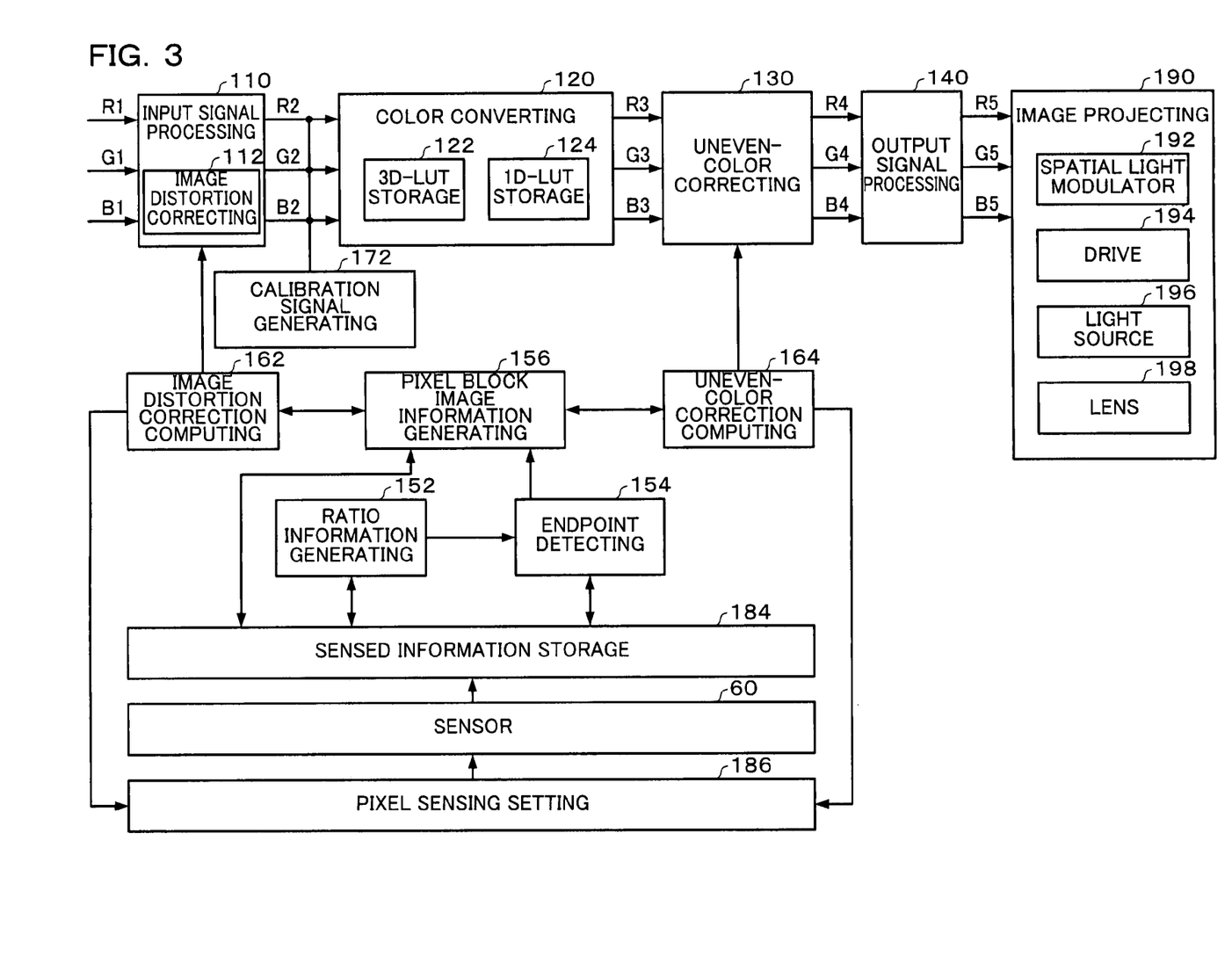
FIG. 3 is a functional block diagram of a projector according to one embodiment of the present invention.

FIG. 3 is a functional block diagram of the projector 20 according to one embodiment of the present invention.

The projector 20 comprises an input signal processing section 110 for converting analog R-, G- and B-signals (R1, G1, B1) from a PC (Personal Computer) into digital R-, G- and B-signals (R2, G2, B2); a color converting section 120 for converting the digital R-, G- and B-signals (R2, G2, B2) into digital R-, G- and B-signals (R3, G3, B3) to correct the color and brightness of the image; a color non-uniformity correcting section 130 for converting the digital R-, G- and B-signals (R3, G3, B3) into digital R-, G- and B-signals (R4, G4, B4) to correct color non-uniformity; an output signal processing section 140 for converting the digital R-, G- and B-signals (R4, G4, B4) into analog R-, G- and B-signals (R5, G5, B5); and an image projecting section 190 for projecting an image based on the analog R-, G- and B-signals.

The input signal processing section 110 comprises an image distortion correcting section 112 for correcting an image distortion (including a trapezoidal distortion, Keystone distortion and the like) against the digital converted R-, G- and B-signals.

The color converting section 120 comprises a 3D-LUT storage section 122 for storing a three-dimensional lookup table (3D-LUT) for image color correction, and a 1D-LUT storage section 124 for storing one-dimensional lookup table (1D-LUT) for image brightness correction.

The image projecting section 190 comprises a spatial light modulator 192, a drive section 194 for driving the spatial light modulator 192, a light source 196 and a lens 198.

The drive section 194 drives the spatial light modulator 192 based on the image signals from the signal output section 140. The image projecting section 190 projects light from the light source 196 through the spatial light modulator 192 and lens 198.

The projector 20 further comprises a calibration signal generating section 172 for generating image signals used to display a calibration image; an sensed information storage section 184 for temporarily storing the sensed information and the like from the sensor 60; a ratio information generating section 152 for generating ratio information based on the sensed information and for detecting the temporary sensed projected image 230; an endpoint detecting section 154 for detecting corner points in the sensed projected image 220 based on the temporary sensed projected image 230; and a pixel block image information generating section 156 for generating a pixel block image based on the corner points.

The projector 20 further comprises an image distortion correction computing section 162 for computing an amount of image distortion correction for the image distortion correcting section 112 based on the pixel block image; a color non-uniformity correction computing section 164 for computing an amount of color non-uniformity correction for the color non-uniformity correcting section 130 based on the pixel block image; and a pixel sensing setting section 186 for generating a control signal used to control the sensor 60 so that an image is sensed with the number of pixels according to the requirements from the image distortion correction computing section 162 and color non-uniformity correction computing section 164.

The sending and receiving of information between the sensor 60 and the sensed information storage section 184 and pixel sensing setting section 186 may be made by any radio communication such as blue tooth and infrared rays or may be made by any wire communication using LAN cables or the like according to any communication protocol based on TCP/IP or the like.

The hardware for implementing each section in the projector 20 may use the followings.

Figure 4:
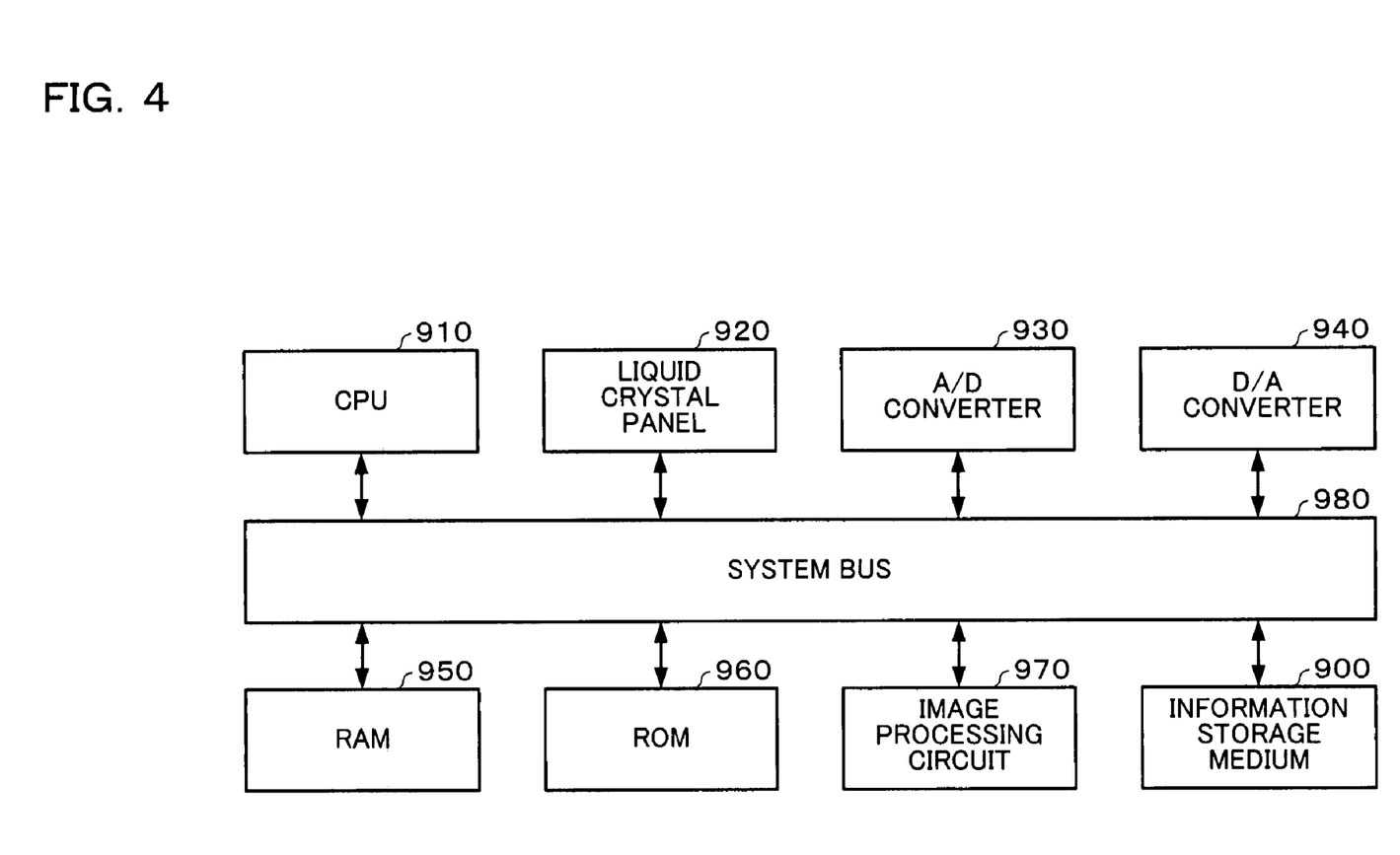
FIG. 4 is a block diagram showing hardware configuration of a projector according to one embodiment of the present invention.

FIG. 4 is a block diagram showing hardware configuration of the projector 20 according to one embodiment of the present invention.

For example, the input signal processing section 110 may be implemented by an A/D converter 930 or the like; the sensed information storage section 184 may be implemented by a RAM 950 or the like; the color non-uniformity correcting section 130, ratio information generating section 152, endpoint detecting section 154, pixel block image information generating section 156 and calibration signal generating section 172 may be implemented by an image processing circuit 970 or the like; the image distortion correction computing section 162 and color non-uniformity correction computing section 164 may be implemented by CPU 910 or the like; the color converting section 120 may be implemented by the image processing circuit 970, RAM 950, CPU 910 or the like; the output signal processing section 140 may be implemented by a D/A converter 940 or the like; the spatial light modulator 192 may be implemented by a liquid crystal panel 920 or the like; and the drive section 194 may be implemented by the use of a ROM 960 or the like for storing a liquid crystal light valve driver for driving the liquid crystal panel 920.

These components are configured to mutually deliver the information therebetween through a system bus 980.

These components may be implemented in a hardware manner or in a software manner such as drivers.

Furthermore, the computer may implement the functions of the ratio information generating section 152 and the like according to a program stored in and read out of an information storage medium 900.

Such an information storage medium 900 may be accomplished, for example, by CD-ROM, DVD-ROM, ROM, RAM, HDD or the like through either of the contact or non-contact type reading mode.

Rather than the information storage medium 900, the aforementioned functions can be implemented by downloading a program or the like for implementing them from a host device or the like through a transmission channel.

Flow of Image Processing

The flow of image processing by use of these parts will be described below.

Figure 5:
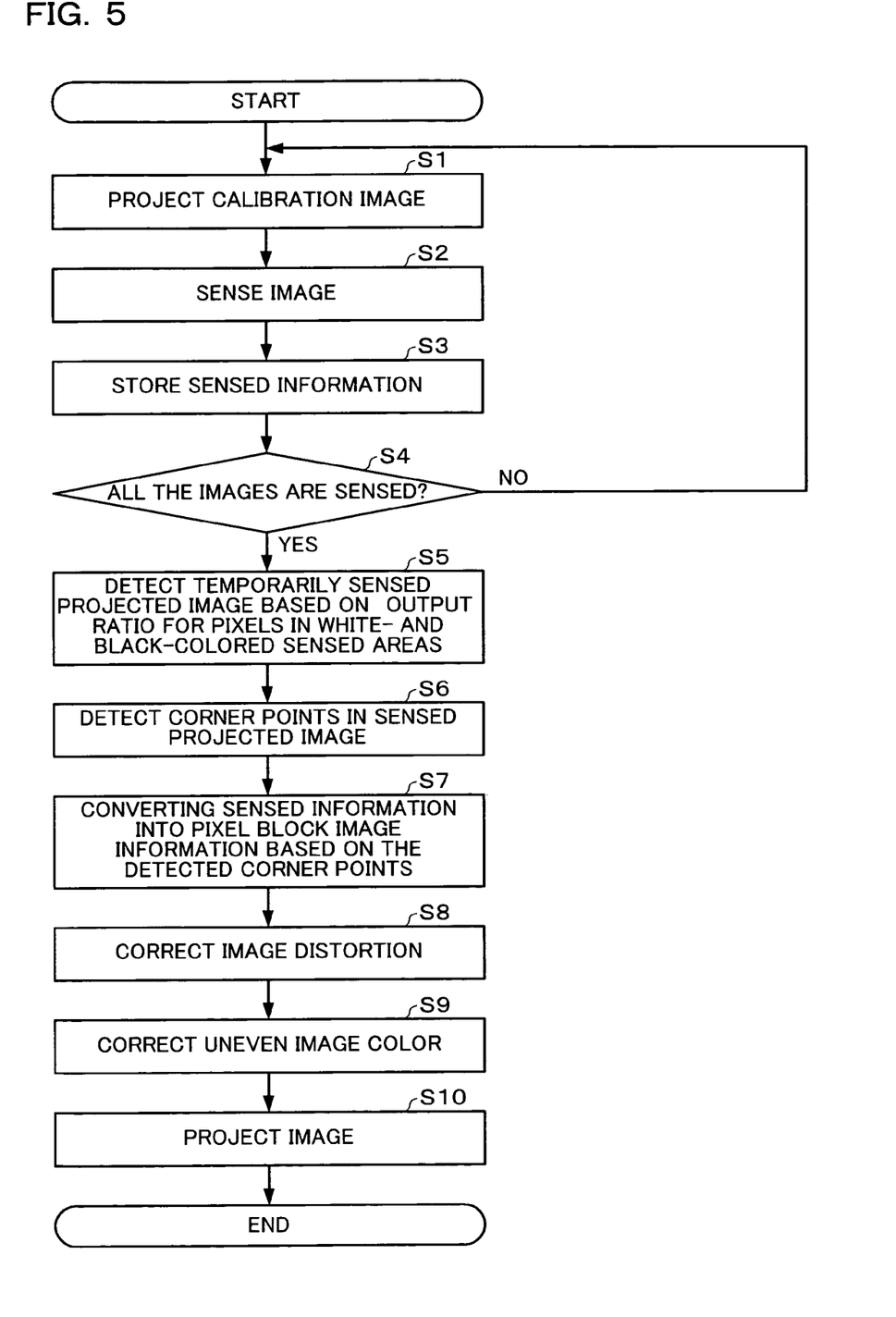
FIG. 5 is a flow chart for illustrating image processing according to one embodiment of the present invention.

FIG. 5 is a flow chart for illustrating image processing according to one embodiment of the present invention.

First of all, the projector 20 projects a plurality of different monochromatic calibration images (step S1). More particularly, if an image distortion is to be corrected, the projector 20 projects white- and black-colored calibration images. If the color and brightness in an image are to be corrected, the projector 20 projects R, G and B calibration images each of which gray scales has been changed by a predetermined gradation unit, in addition to the aforementioned calibration images.

First of all, the image projecting section 190 projects a first calibration image onto the screen 10 (step S1).

The sensor 60 changes the setting so that an image will be sensed with a predetermine number of pixels, based on control information transmitted from the pixel sensing setting section 186 in the projector 20, and captures the first calibration image projected onto the screen 10 by means of the image projecting section 190 when the user activates the button (step S2).

In such a manner, the sensed information can be processed more effectively for the purpose since the amount of information can be controlled by adjusting the number of pixels to be sensed.

The sensor 60 then sends the sensed information to the projector 20 while the sensed information storage section 184 stores the sensed information (step S3).

The calibration signal generating section 172 judges whether or not the projection of all the calibration images has been done (step S4). If not so, the projector 20 repeatedly carries out the steps S1 to S3.

In such a manner, the sensed information storage section 184 stores the sensed information relating to all the calibration images. The ratio information generating section 152 then computes a ratio for each pixel (e.g., R-signal value or the like) based on the sensed information for the white- and black-colored calibration images which have been stored in the sensed information storage section 184, and detects a rectangular-shaped temporary sensed projected image 230 based on the ratio (step S5). The ratio information generating section 152 causes the sensed information storage section 184 to store the ratio information which represents the ratio for each pixel in the sensed information.

The ratio may be (the luminance value of the white-colored calibration image/the luminance value of the black-colored calibration image-1) or (the luminance value of the white-colored calibration image/the luminance value of the black-colored calibration image. In this embodiment, it is supposed that the ratio is the luminance value of the white-colored calibration image/the luminance value of the black-colored calibration image.

The ratio information generating section 152 determines whether or not the sum of ratios in the respective pixel lines arranged inwardly from the respective sides of the sensing area 210 is equal to or larger than a predetermined value (e.g., 2.0 * the number of pixels forming the pixel line). For example, the ratio information generating section 152 may search each pixel line downwardly from a side AB in FIG. 2 and terminate the downward search at a point of time when the aforementioned sum becomes equal to or larger than the predetermined value in the pixel lines on another side EF. The ratio information generating section 152 similarly performs the searches in the rightward direction from a side AD, in the leftward direction from a side BC and in the upward direction from a side CD and then detects the temporary sensed projected image 230 surrounded by the four sides at each of which the sum is equal to or larger than the predetermined value.

The ratio information generating section 152 may have changed the luminance value at which the ratio of luminance values in the corresponding pixels is less than a predetermined value (e.g., 2.0) into zero as pre-processing prior to the detection of the temporary sensed projected image 230 and caused it to be stored in the sensed information storage section 184.

The endpoint detecting section 154 detects corner points in the sensed projected image 220 based on the rectangular temporary sensed projected image 230 (step S6). The technique of detecting the corner points will be described more concretely.

The endpoint detecting section 154 basically searches each of the pixels on the respective sides of the temporary sensed projected image 230 starting from the respective corner points E, F, G and H on the temporary sensed projected image 230, and to detect a pixels each having its luminance value equal to or larger than a predetermined value (e.g., 2.0) as a corner point in the sensed projected image 220.

If the endpoint detecting section 154 continuously detects two or more pixels having their ratios equal to or larger than 2.0 in the same searching direction, it may detect one pixel having the maximum ratio among a group of detected pixels or a first pixel having its ratio equal to or larger than 2.0, as a corner point.

It the endpoint detecting section 154 is to search two different sides of the temporary sensed projected image 230 starting from each of the corner points thereof, the following technique may be taken. For example, when the pixels on the horizontal and downward sides (e.g., sides EF and EH in FIG. 2) of the temporary sensed projected image 230 starting from the leftward and upward corner point thereof (e.g., corner point E in FIG. 2) are to be searched and if a point having its ratio equal to or larger than 2.0 is detected within a predetermined number of pixels in the rightward search starting from the leftward and upward corner point in the temporary sensed projected image 230, the downward search starting from the aforementioned corner point may be continued until a pixel having its ratio less than 2.0 is detected, even though a point having its ratio equal to or larger than 2.0 has been detected, and detect a pixel just before the pixel having its ratio less than 2.0 as a corner point on the downward extending side.

If a pixel having its ratio equal to or larger than a threshold is readily detected starting from a corner point in a search on any side, it is possible that one side of the sensed projected image 220 overlaps the other side of the temporary sensed projected image 230, for example, under the influence of quantization error since one corner point in the sensed projected image 220 is very near to one corner point in the temporary sensed projected image 230.

Even in such case, the projector 20 can prevent such an overlap of sides and adequately detect the sensed projected image 220 by adopting the second search technique.

However, if the search is performed only on the sides of the temporary sensed projected image 230 as described, it is possible that the endpoint detecting section 154 has detected only three or less corner points. In such a case, the endpoint detecting section 154 also searches the interior of the temporary sensed projected image 230.

Figure 6A:
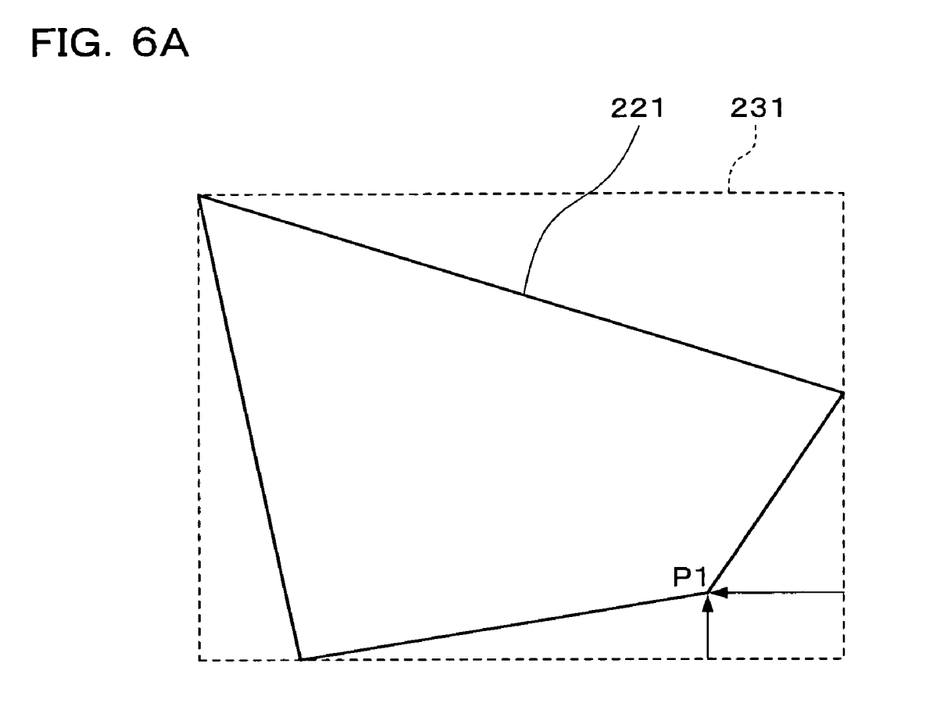
FIG. 6A is a diagram schematically showing a temporary sensed projected image when three corner points have been detected.
Figure 6B:
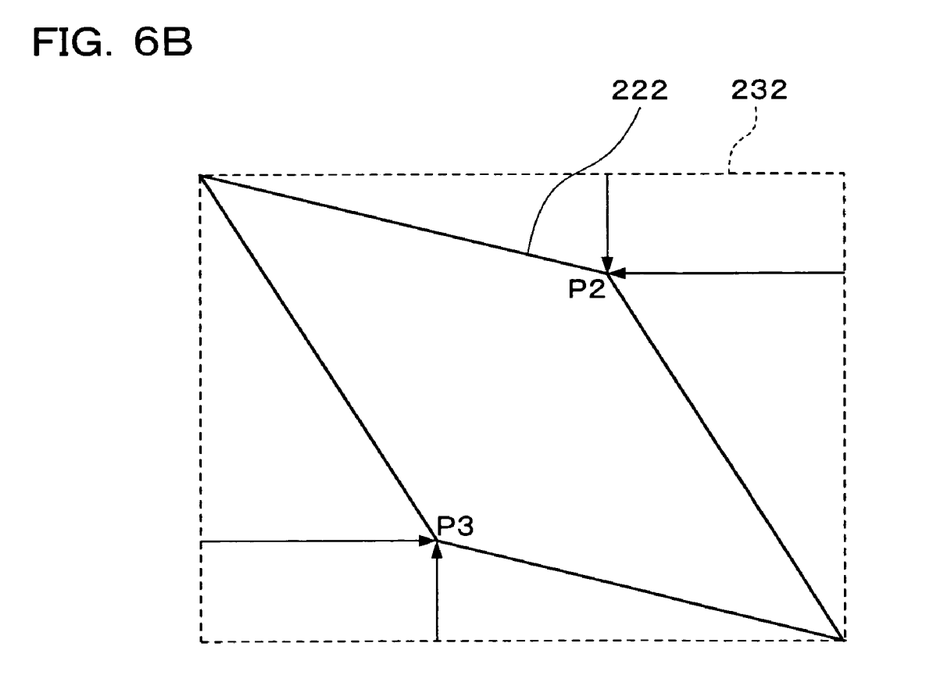
FIG. 6B is a diagram schematically showing a temporary sensed projected image when two corner points have been detected.

FIG. 6A is a diagram schematically showing a temporary sensed projected image 231 when three corner points have been detected; and FIG. 6B is a diagram schematically showing a temporary sensed projected image 232 when two corner points have been detected.

If the endpoint detecting section 154 have detected only three or less corner points as shown in FIGS. 6A and 6B, it counts the number of pixels having their ratios less than 2.0 for each pixel line starting from four corners of a non-sensed projected image having its ratio less than 2.0 (i.e., a sensing area 210 other than the sensed projected image 220) toward the interior of the temporary in all the directions, and determines the ratio of counts for each set consisting of a predetermined pixel line and another pixel line adjacent to the predetermined pixel line. The endpoint detecting section 154 then detects a corner point if the rates of change in this ratio and a ratio of counts for two pixel lines before the aforementioned pixel line exceed a predetermined value.

The predetermined value used herein may be (an average ratio of counts in the same searching direction * 1.2) for example. In other words, the endpoint detecting section 154 may detect a corner point using a pixel line where its ratio of counts is separated off from the average value.

For example, in the cases of FIGS. 6A and 6B, the rate of change for the ratio of counts will largely be varied since there is a large difference in the number of pixels having its ratios of luminance value less than 2.0 between a pixel line wherein a corner point shown by arrow exists and another adjacent pixel line. Thus, the endpoint detecting section 154 can detect three points P1, P2 and P3 as corner points.

In such a manner, the endpoint detecting section 154 detects four corner points in the sensed projected image 220.

The pixel block image information generating section 156 converts sensed information for predetermined sensing areas of various colors such as white, red, green and blue into pixel block image information, based on the information of corner points from the endpoint detecting section 154 (step S7).

The pixel block image information will be described.

The pixel block image information is one that is provided by converting the ratio information in the sensed projected image 220 surrounded by the corner points detected by the endpoint detecting section 154 into information representing image signal values or ratio of luminance values for each pixel block that is formed by one or more pixels. This number of pixel blocks may one that is determined depending on the processing in any correction means such as the color non-uniformity correcting section 130 or the like.

Figure 7:
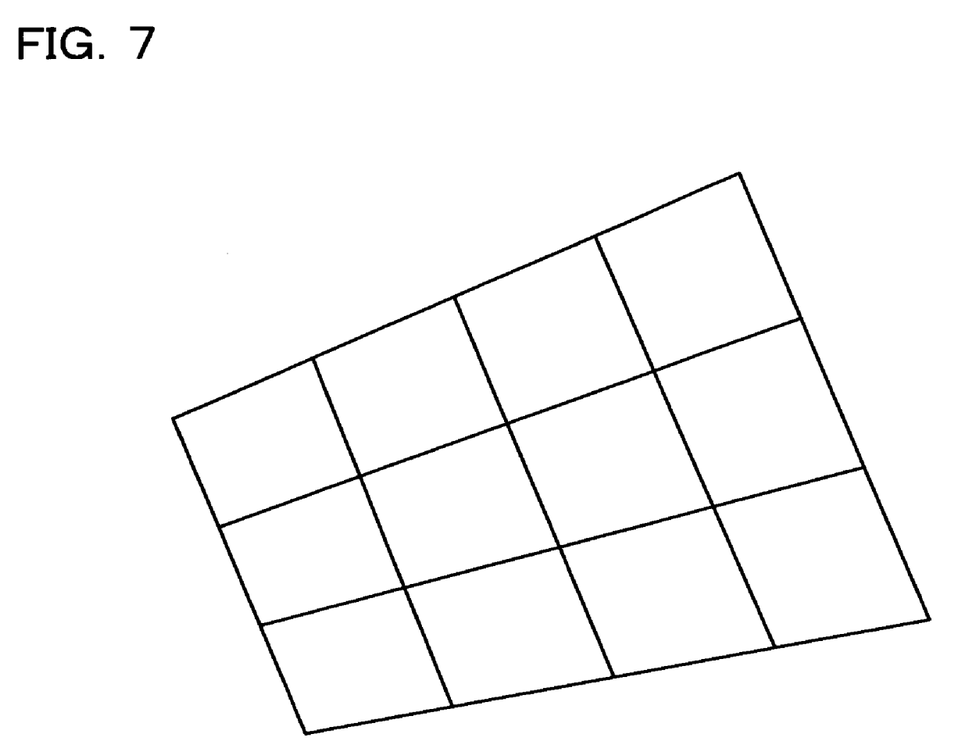
FIG. 7 is a diagram schematically showing a pixel block image according to one embodiment of the present invention.

In an extreme example for easy understanding, a pixel block image converted from the sensed projected image 220 shown in FIG. 2 may be as shown in FIG. 7 if the spatial light modulator 192 includes three pixels in the vertical direction and four pixels in the horizontal direction.

FIG. 7 is a diagram schematically showing a pixel block image according to one embodiment of the present invention.

As shown in FIG. 7, the sensed projected image 220 is partitioned into 12 pixel blocks, three blocks in the vertical direction and four blocks in the horizontal direction.

The pixel block image information generating section 156 sets a group of pixel blocks depending on the processing in the correction means; computes the average image signal or luminance values in a group of pixels forming each pixel block, based on the sensed information of each calibration image stored in the sensed information storage section 184; generates pixel block image information showing the average luminance value or the like for each pixel block; and stores the pixel block image information for each calibration image in the sensed information storage section 184.

The image distortion correction computing section 162 detects the change of luminance value based on the pixel block image information for whit-colored calibration image stored in the sensed information storage section 184. The image distortion correction computing section 162 then detects a distortion in the projected image 12 based on the change of luminance value for the pixel block and computes the amount of image distortion correction.

For example, if the luminance value on the left side of the projected image 12 is relatively high, the image distortion correction computing section 162 can detect that the optical projection axis is out of the center of the projected image 12 in the rightward direction and that the projected image 12 is distorted into a trapezoidal shape having a left shorter side and a right longer side.

The image distortion correcting section 112 corrects digital R-, G- and B-signals to generate digital R-, G- and B-signals (R2, G2, B2) for correcting the image distortion, based on the amount of image distortion from the image distortion correction computing section 162 (step S8).

Thus, the projector 20 can correct the image distortion.

The color non-uniformity correction computing section 164 computes the amount of correction of input/output characteristic data for each pixel block, based on the pixel block image information. More particularly, the color non-uniformity correction computing section 164 may compute the amount of correction so that the inclination of a line representing the corrected input/output characteristic becomes one (1).

The term "input/output characteristic data" used herein is intended to mean data that indicate the input/output characteristic and that also indicate the relationship between a brightness index value of an input signal (e.g., gray-scale value) and a brightness index value of an output signal (e.g., luminance, illuminance, or color information value). The brightness index value is a value providing an index of brightness and more particularly it may include luminance, illumination, color information value (such as digital R-signal value), gray-scale value and other values provided by deforming these values through normalization or the like.

The color non-uniformity correcting section 130 corrects the input/output characteristic data to correct color non-uniformity in the image, based on the amount of color non-uniformity correction from the color non-uniformity correction computing section 164, and corrects the R-, G- and B-signals (R3, G3, B3) into the R-, G- and B-signals (R4, G4, B4), based on the input/output characteristic data (step S9).

Finally, the image projecting section 190 projects an image corrected for image distortion and color non-uniformity through the above-mentioned procedure (step S10).

As described, the projector 20 of this embodiment can precisely detect the four corners in the sensed projected image 220 in accordance with this embodiment and therefore can precisely and effectively cause the coordinates of the sensed projected image 220 in the sensing area to be associated with the coordinates of the spatial light modulator 192.

According to this embodiment, furthermore, the projector 20 can adequately perform the correction and precisely and effectively cause the coordinates of the sensed projected image 220 in the sensing area to be associated with the coordinates of the spatial light modulator 192 by correcting the pixel blocks that are provided by partitioning the interior of the sensed projected image 220 in the sensing area 210 depending on the processing in the correction means such as the color non-uniformity correcting section 130 or the like.

The projector 20 can more effectively the image processing since the number of pixel blocks is less than the number of pixels in the original sensing area.

According to this embodiment, the projector 20 can precisely and effectively detect the corner points in the sensed projected image 220 by using the ratio information provided from the computation of the ratio of image signal or luminance values for each pair of pixels in the sensing area 210, in comparison with the conventional technique of detecting the corner points through filtering.

According to this embodiment, the projector 20 can more effectively make the image processing since it uses the ratios rather than the differential values and therefore does not require any change of judgmental criterion for the corner points in the sensed projected image 220 depending on the applied environment.

According to this embodiment, the projector 20 detects the corner points using the different search method even though only three or less corner points can be detected when it is wanted to detect the corner points at the four corners in the sensed projected image 220. Thus, the projector 20 can precisely and effectively detect the four corner points in and cause the coordinates of the sensed projected image 220 in the sensing area to be precisely associated with the coordinates of the spatial light modulator 192, even if the image is distorted into any one of various different shapes.

According to this embodiment, the projector 20 can display a correct image since it can precisely detect the sensed projected image in the sensing area and since it can precisely correct the distortion and color non-uniformity in the image for each pixel block even if the sensed projected image is divided into pixel blocks for correcting image signals.

According to this embodiment, the projector 20 can adequately correct color non-uniformity by time degradation or environmental impact (e.g., in a case where there is ambient light 80 or a case where the screen 10 is non-uniformly colored) since it can detect any differential color between the pixel blocks.

Modifications

Although the embodiment of the present invention has been described, the present invention is not limited to the embodiment.

Although the embodiment has been described as to the projector 20 for correcting the image distortion and color non-uniformity, the present invention is similarly effective for any other correction.

Although the above embodiment has been described as to the projector 20 for generating the ratio information by the use of the sensed information for white- and black-colored calibration images, a monochromatic green-colored calibration image may be projected and sensed in addition to the aforementioned calibration images. Based on sensed information for white and black colors and for green and black colors, two kinds of ratio information may be generated to compute the product set (AND) for two kinds of ratio information, thereby setting a true region as a region to be detected in the temporary sensed projected image 230.

Consequently, the influence of any noise produced when the image is sensed can be reduced. Thus, the projector 20 can detect more precisely the temporary sensed projected image 230 and sensed projected image 220. Although the embodiment has been described as to the projector 20 for detecting the sensed projected image 220 after the temporary sensed projected image 230 has been set, the sensed projected image 220 may be detected directly from the sensed information.

Although the embodiment has been described as to the projector 20 for detecting the temporary sensed projected image 230 by applying a pixel line as a predetermined pixel region, the temporary sensed projected image 230 may be detected by using one pixel, a plurality of pixels, a rectangular area configured by a plurality pixels or the like as a pixel region.

Although corner points are used as edge points in this embodiment, points on sides other than the corner points of the sensed projected image 220 may be used instead of the corner points.

Although the embodiment has been described as to the projector 20 for performing the search inward from the outside of the temporary sensed projected image 230, the search may be performed outward from the inside of the temporary sensed projected image 230.

Although the embodiment has been described as to the image processing system mounted within the projector 20, the image processing system may be mounted in any image display device such as CRT (Cathode Ray Tube) other than the projector 20. The projector 20 may be a projectors using DMD (Digital Micromirror Device) other than liquid crystal projector. DMD is a trademark possessed by the U.S. Texas Instruments.

The function of the projector 20 may be accomplished solely by the projector 20 or by a plurality of decentralized processing components (e.g., one projector and one PC).

Although the embodiment has been described as to the sensor 60 separated from the projector 20, the projector 20 may include the function of the sensor 60.

What is claimed is:

1. An image processing system comprising:
    image projection means for projecting at least two difference colored calibration images at different points of time;
    sensing means for sensing each of the projected calibration images to output sensed information;
    ratio information generating means for computing a ratio of image signal values or luminance values for each pixel in a sensing area obtained by sensing the calibration images, based on the sensed information to generate ratio information;
    edge point detecting means for searching the ratio information to find a first value which represents a ratio of image signal values or luminance values among pixel regions each having a predetermined number of pixels in the sensing area, and for detecting edge points of a sensed projected image, based on part of the pixel regions each having the first value equal to or larger than a first predetermined value;
    pixel block image information generating means for converting sensed information of an area defined by the detected edge points into pixel block image information representing a ratio of image signal values or luminance values for each pixel block including one or more pixels, based on the sensed information and the detected edge points; and
    correction means for correcting an image signal based on the pixel block image information,
    wherein the correction means includes:
    distortion correction means for correcting an image signal to correct distortion in an image based on the pixel block image information; and
    color non-uniformity correction means for correcting an image signal to correct color non-uniformity based on the pixel block image information; and
    wherein the image projection means projects an image based on an image signal with corrected distortion and corrected color non-uniformity.

2. The image processing system as defined in claim 1, wherein:
    the ratio information generating means includes means for detecting a rectangular region defied by the pixel regions each having the first value equal to or larger than the first predetermined value as a temporary sensed projected image by searching the ratio information for the first value in vertical and horizontal directions from edge points of an area corresponding to the sensing area represented by the ratio information;
    an image projected by the image projection means is a quadrangle; and
    the edge point detecting means detects edge points at for corners of the sensed projected image, based on the temporary sensed projected image.

3. The image processing system as defined in claim 2, wherein:
    when the number of detected edge points is three or less, the edge point detecting means detects other edge points by using a predetermined method; and
    the predetermined method includes:
    counting the numbers of pixels from an edge pixel to a pixel having the ratio represented by the ratio information equal to or larger than a second predetermined value in each pixel line of the temporary sensed projected image;
    computing a changing rate of a ratio of the number of pixels in every two adjacent pixels lines of the temporary sensed projected image; and
    detecting pixels having the ratio represented by the ratio information equal to or larger than the second predetermined value as the other edge points in a pixel line having the changing rate equal to or larger than a third predetermined value.

4. A projector comprising:
    image projection means for projecting at least two different colored calibration images at different points of time;
    sensing means for sensing each of the projected calibration images to output sensed information;
    ratio information generating means for computing a ratio of image signal values or luminance values for each pixel in a sensing area obtained by sensing the calibration images, based on the sensed information to generate ratio information;

edge point detecting means for searching the ratio information to find a first value which represents a ratio of image signal values or luminance values for pixel regions each having a predetermined number of pixels in the sensing area, and for detecting edge points of a sensed projected image, based on part of the pixel regions each having the first value equal to or larger than a first predetermined value;

pixel block image information generating means for converting sensed information of an area defined by the detected edge points into pixel block image information representing a ratio of image signal values or luminance values for each pixel block including one or more pixels, based on the sensed information and the detected edge points; and correction means for correcting an image signal based on the pixel block image information, wherein the correction means includes:

distortion correction means for correcting an image signal to correct distortion in an image based on the pixel block image information; and color non-uniformity correction means for correcting an image signal to correct color non-uniformity based on the pixel block image information; and wherein the image projection means projects an image based on an image signal with corrected distortion and corrected color non-uniformity.

5. A computer-readable medium storing a computer-readable program which causes a computer to function as:

image projection means for projecting at least two different colored calibration images at different points of time;

sensing means for sensing each of the projected calibration images to output sensed information;

ratio information generating means for computing a ratio of image signal values or luminance values for each pixel in a sensing area obtained by sensing the calibration images, based on the sensed information to generate ratio information;

edge point detecting means for searching the ratio information to find a first value which represents a ratio of image signal values or luminance values for pixel regions each having a predetermined number of pixels in the sensing area, and for detecting edge points of a sensed projected image, based on part of the pixel regions each having the first value equal to or larger than a first predetermined value;

pixel block image information generating means for converting converts sensed information of an area defined by the detected edge points into pixel block image information representing a ratio of image signal values or luminance values for each pixel block including one or more pixels, based on the sensed information and the detected edge points; and correction means for correcting an image signal based on the pixel block image information, wherein the correction means includes:

distortion correction means for correcting an image signal to correct distortion in an image based on the pixel block image information; and color non-uniformity correction means for correcting an image signal to correct color non-uniformity based on the pixel block image information; and wherein the image projection means projects an image based on an image signal with corrected distortion and corrected color non-uniformity.

6. An image processing method comprising:

sequentially projecting a plurality of monochromatic calibration images of different colors;

sensing the projected calibration images and outputting sensed information;

computing a ratio of image signal values or luminance values for each pixel in a sensing area obtained by sensing the projected calibration images, based on the sensed information;

generating ratio information for the sensing area;

searching the ratio information to find a first value which represents a ratio of image signal values or luminance values for pixel regions each having a predetermined number of pixels in the sensing area, and detecting edge points of a sensed projected image based on part of the pixel regions having the first value equal to or larger than a first predetermined value;

converting sensed information of an area defied by the detected edge points into pixel block image information representing a ratio of image signal values or luminance values for each pixel block including one or more pixels, based on the sensed information and the detected edge points;

correcting an image signal to correct distortion, and color non-uniformity in an image, based on the pixel block image information; and projecting an image based on the corrected image signal.

7. The image processing method as defined in claim 6, further comprising:

detecting a rectangular region defined by the pixel regions each having the first value equal to or larger than the first predetermined value as a temporary sensed projected image by searching the ratio information for the first value in vertical and horizontal directions form edge points of an area corresponding to the sensing area represented by the ratio information; and detected edge points at for corners of the sensed projected image as the edge points of the sensed projected image, based on the temporary sensed projected image.

8. The image processing method as defined in claim 7, wherein:

when the number of detected edge points is three or less, other edge points are detected by a predetermined method; and the predetermined method includes:

counting the numbers of pixels from an edge pixel to a pixel having the ratio represented by the ratio information equal to or larger than a second predetermined value in each pixel line of the temporary sensed projected image;

computing a changing rate of a ratio of the number of pixels in every two adjacent pixel lines of the temporary sensed projected image; and detecting pixels having the ratio represented by the ratio information equal to or larger than the second predetermined value as the other edge points in the pixel line having the changing rate equal to or larger than a third predetermined value.

* * * * *